April 14, 1925.
F. THORNTON, JR
1,533,283
AUTOMATIC THERMAL CONTROL SYSTEM
Filed Dec. 13, 1922
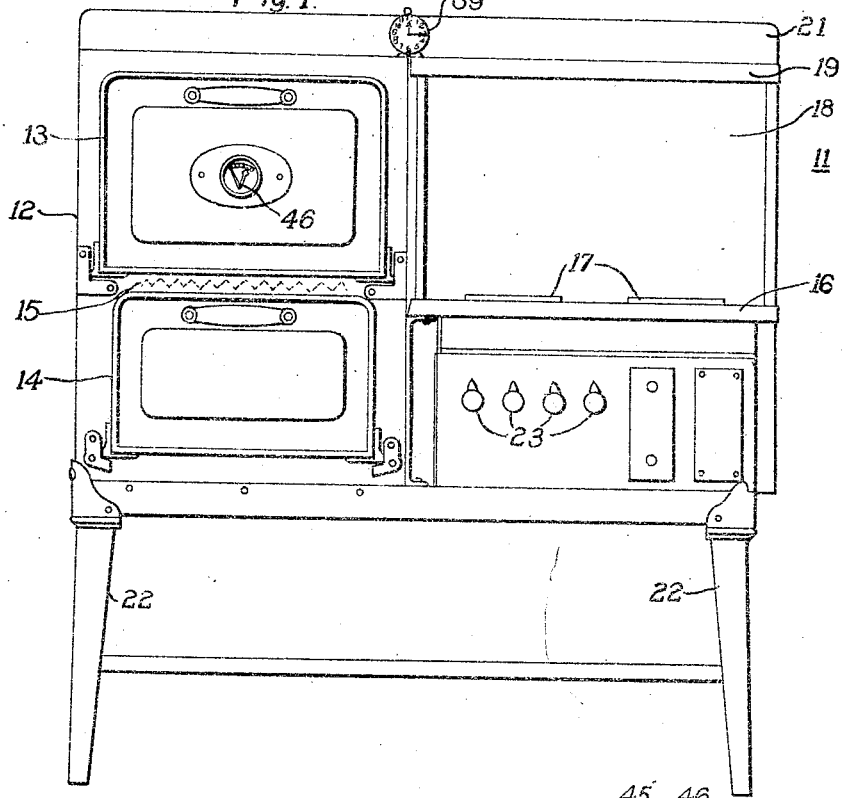
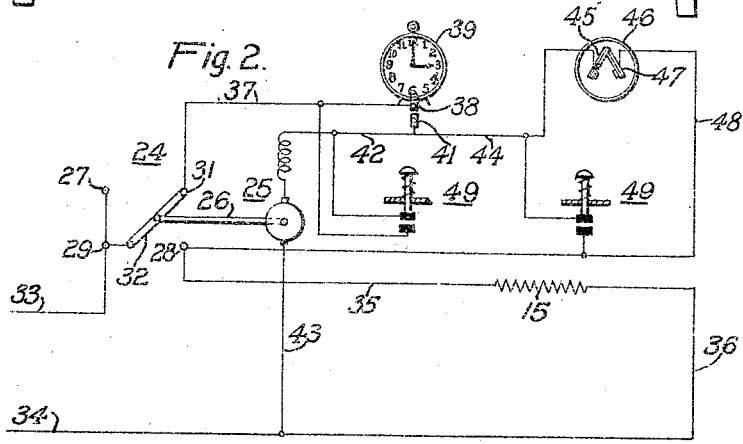
WITNESSES:
INVENTOR
Frank Thornton Jr.
BY
*Wesley G. Carr*
ATTORNEY 1,533,283

UNITED STATES PATENT OFFICE.

FRANK THORNTON, JR., OF WILKINSBURG, PENNSYLVANIA, ASSIGNOR TO WESTING-HOUSE ELECTRIC & MANUFACTURING COMPANY, A CORPORATION OF PENNSYLVANIA.

AUTOMATIC THERMAL CONTROL SYSTEM.

Application filed December 13, 1922. Serial No. 606,646.

*To all whom it may concern:*

Be it known that I, FRANK THORNTON, Jr., a citizen of the United States, and a resident of Wilkinsburg, in the county of Allegheny and State of Pennsylvania, have invented a new and useful Improvement in Automatic Thermal Control Systems, of which the following is a specification.

My invention relates to electric heating appliances and particularly to temperature control systems therefor.

The object of my invention is to provide a relatively simple and inexpensive control system for the heating element of an electric appliance.

In practicing my invention, I provide a motor-operated snap switch to control the energization of an electric heating element. A clock actuates the motor to close the circuit through the heating element at a predetermined time and a thermostat actuates the motor to interrupt the circuit through the heating element upon the occurrence of a predetermined temperature therein. Manually operable means are provided for permitting the actuation of the motor either to close the circuit or to interrupt the same in case of necessity.

In the drawings,

Figure 1 is a view, in front elevation, of an electric range employing the system embodying my invention, and Fig. 2 is a diagrammatic view of apparatus and electrical connections embodying my invention.

An electric range 11 comprises an oven 12 which may be provided with an upper door 13 and a lower door 14. An electric heating element 15, of any suitable or desired construction, is located in the oven 12 in such position as to be intermediate the upper and the lower doors.

A stove top 16 located in side-by-side relation to the oven 12 is provided with a plurality of electric heating units 17. The heating units 17 are not particularly illustrated, as they may comprise any suitable or desired construction of electric heating elements usually employed in the art. The range 11 is provided with a stove back 18, shelf 19 and a shelf back 21, these parts being of any suitable or desired construction. A plurality of supporting members 22 are provided for the range 11.

A plurality of manually operable switches (not shown) are located beneath the stove top 16 and are provided with operating knobs 23 to permit of selectively energizing the heating elements 17.

A snap switch 24 for controlling the energization of the oven heating element 15, is actuated by a small electric motor 25. The motor 25 may be connected to the snap switch 24, by a shaft 26, although this is not essential and if it is desired, a suitable gear drive, (not shown) may be employed in order to reduce the size of the motor 25. The snap switch 24 is provided with a plurality of pairs of contact members 27—28 and 29—31, which are selectively electrically connected by a contact bridging member 32, moved by the shaft 26. The contact members 27 and 29 are electrically connected together and to one conductor 33 of a supply circuit comprising conductors 33 and 34.

The contact terminal 28 is electrically connected by a conductor 35 to one terminal of the heating element 15, the other terminal of which is connected by a conductor 36, to the supply circuit conductor 34. The contact member 31 is connected by a conductor 37, to an adjustable contact member 38, which is mounted on a clock 39. An adjustable contact member 41 co-operating with the contact member 38 is electrically connected, by a conductor 42, to one terminal of the motor 25, the other terminal of the motor 25 being connected by a conductor 43 to the supply circuit conductor 34.

The contact terminal 41 is connected by a conductor 44 to one end of a bi-metallic strip 45, located in a thermostatic device 46 which is mounted in the front of the upper oven door 14. A manually adjustable contact arm 47 which is provided in the device 46, is adapted to be operatively engaged by the free end of the bi-metallic strip 45 when the temperature of the oven 12 reaches a predetermined value. One end of the contact arm 47 is electrically connected by a conductor 48 to the contact terminal 28 of the switch 24.

Manually operable push buttons 49 have their respective contacts electrically connected to the conductors 37 and 42, and to the conductors 44 and 48, respectively, so that an actuating circuit through the motor 25 may be established, in parallel circuit relation to those controlled by the time device 39 and the temperature actuated device 46.

The diagram in Fig. 2 illustrates the open circuit position of the switch, in which case the heating element 15 is de-energized. If it be assumed that the clock 39 is operative to cause the movable contact member 38 to engage the contact member 41 a circuit is established through the motor 25 as follows: From supply circuit conductor 33, terminal 29, bridging member 32, terminal 31, conductor 37, terminals 38, and 41, conductor 42, motor 25 and through conductor 43 to the other supply circuit conductor 34. The motor thus energized, operates to move the contact bridging member 32 to a position in which it electrically connects the terminals 27 and 28, thereby establishing a circuit through the heating element 15. If the temperature in the chamber of the oven 12 reaches such value as to cause the free end of the bi-metallic strip 45 to operatively engage the free end of the adjustable contact arm 47, the following motor-energizing circuit is established: From supply circuit conductor 33, terminal 27, bridging member 32, terminal 28, conductor 48, arm 47, bi-metallic strip 45, conductors 44 and 42, motor 25 and through conductor 43 to the supply circuit conductor 34. The motor then operates to again move the contact bridging member 32 to the position where it electrically connects the switch terminals 29 and 31, whereby the energizing circuit through the heating element 15 is interrupted.

The system embodying my invention thus provides a relatively simple means comprising a single circuit-controlling device which is selectively time and temperature controlled to control the energization of a heating element.

Various modifications and changes in detail and arrangement may be made without departing from the spirit and scope of the invention, and such modifications are intended to be covered by the appended claims.

I claim as my invention:

1. In a heating system for electrically heated appliances in combination, a heating element, a snap switch for controlling the energization of said heating element, an electric motor for actuating said snap switch, a time controlled electric circuit for energizing said motor to actuate said switch to a position to permit energization of said heating element, and a separate temperature controlled electric circuit for energizing said motor to actuate said switch to a position to de-energize said heating element.

2. In a heating system for electrically heated appliances in combination, a heating element, a snap switch for controlling the energization of said heating element, an electric motor for actuating said snap switch, a time controlled electric circuit for energizing said motor to actuate said switch to a position to permit energization of said heating element, and a separate temperature controlled electric circuit for energizing said motor to actuate said switch to a position to de-energize said heating element, said snap switch being so connected relatively to both of said electric controlling circuits as to interrupt the circuits therethrough upon its operation.

In testimony whereof, I have hereunto subscribed my name this 8th day of December, 1922.

FRANK THORNTON, Jr.